J. HUNT.
TOOL HOLDER.
APPLICATION FILED AUG. 6, 1921.
1,409,719.
Patented Mar. 14, 1922.
2 SHEETS—SHEET 1.
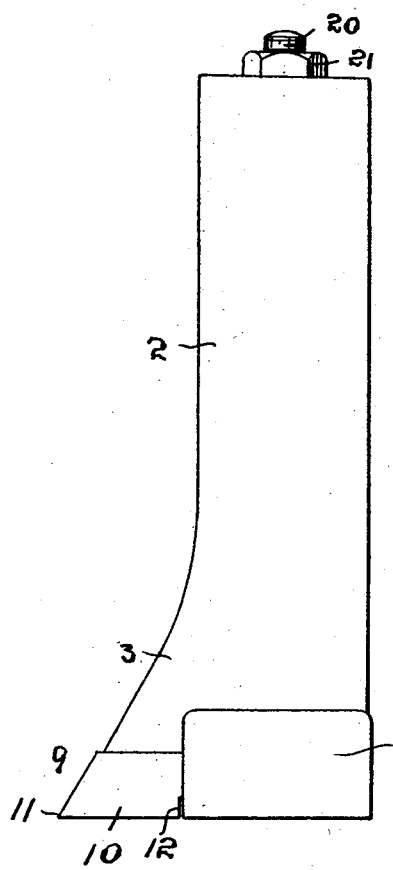
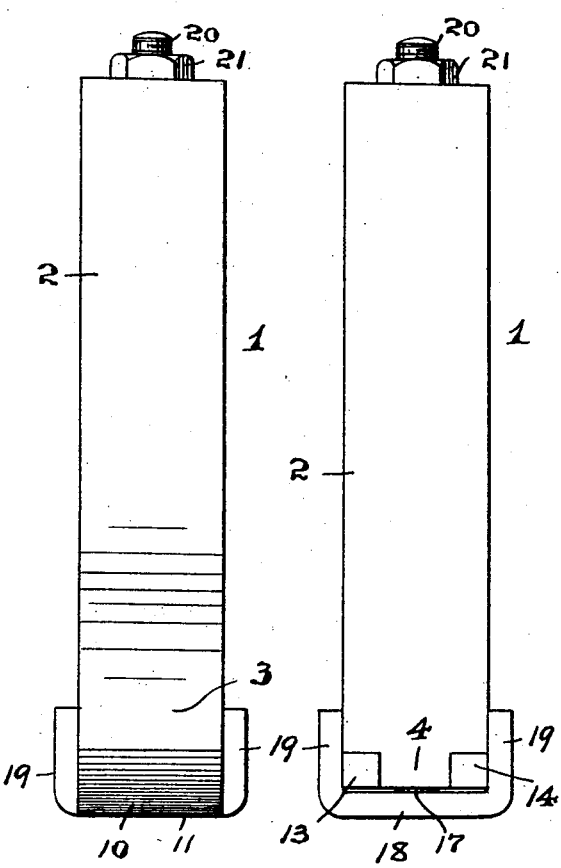
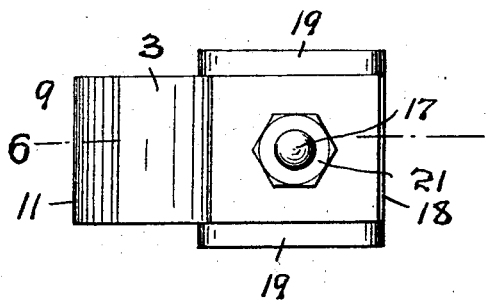
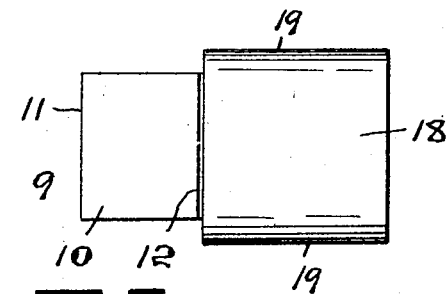
INVENTOR:
John Hunt,
BY Fraentzel and Richards
ATTORNEYS

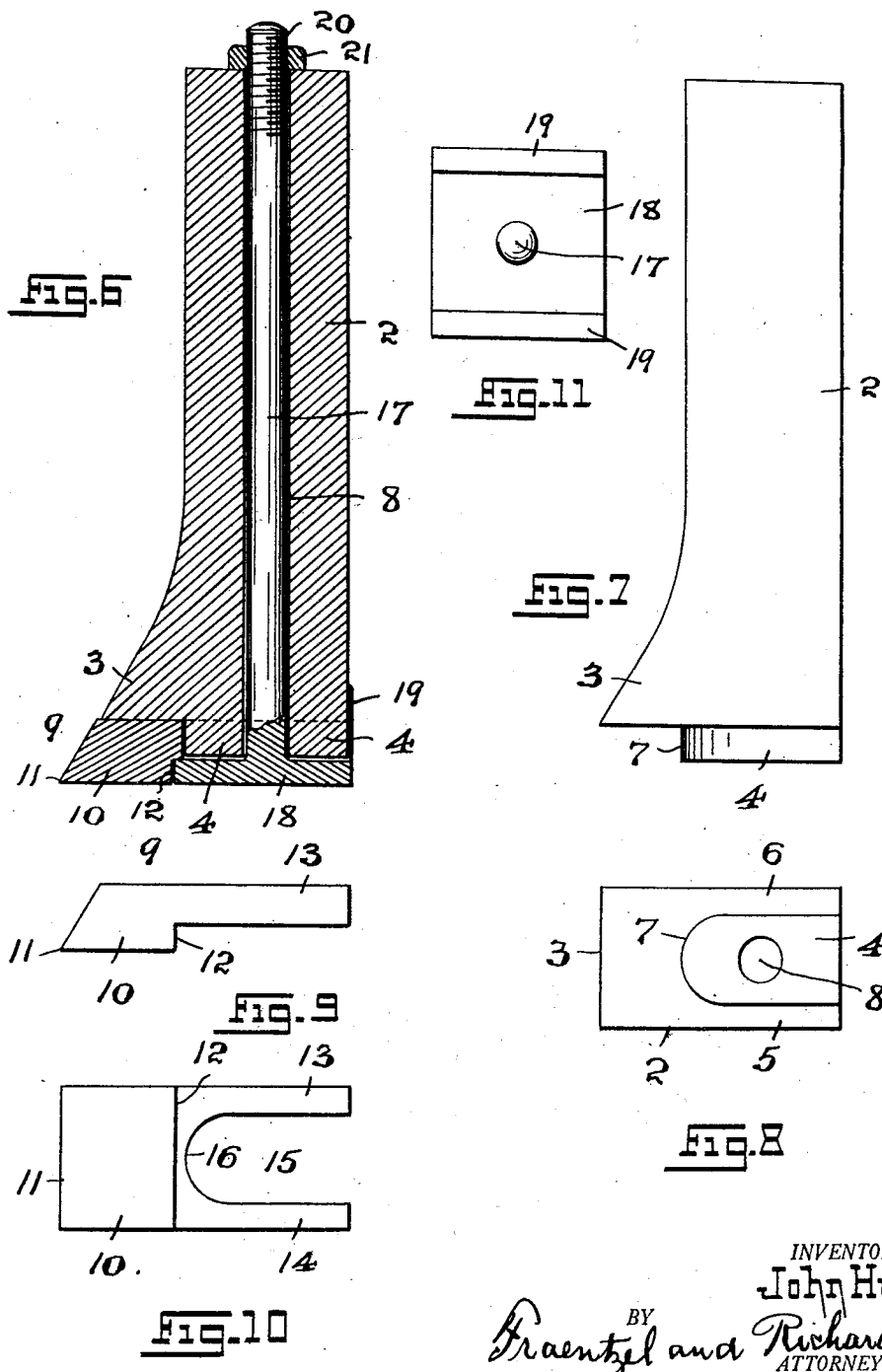

UNITED STATES PATENT OFFICE.

JOHN HUNT, OF NEWARK, NEW JERSEY.

TOOL HOLDER.

1,409,719.  Specification of Letters Patent.  Patented Mar. 14, 1922.

Application filed August 6, 1921. Serial No. 490,215.

*To all whom it may concern:*

Be it known that I, JOHN HUNT, a citizen of the United States, residing at Newark, in the county of Essex and State of New Jersey, have invented certain new and useful Improvements in Tool Holders; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in tool-holders for planing machines, lathes, and other analogous machine-tools; and, the present invention has reference, more particularly, to a novel and simple construction of tool-holder of the general character hereinafter more fully set forth, comprising a stock or shank of a low-grade steel, or other suitable metal, and a cutter of a high-grade steel, detachably connected with the said stock or shank, to permit of properly re-sharpening of the said cutter, or to replace a worn out cutter by a new cutter, without having to dispense with the stock or shank which is still useful, and is expensive to replace.

The present invention, therefore, has for its principal object to provide a novel and simply constructed tool-holder for planing machines, lathes, and the like, comprising a stock or shank of an inexpensive metal, being usually made of a low-grade steel, and a cutter detachably connected therewith, said cutter being necessarily made of an expensive metal, as a high-grade steel, all with a view of providing a tool or implement in which, primarily, a worn-out cutter can be readily replaced by a new cutter without having to discard the cutter-receiving stock or shank, so as not only to reduce the cost of manufacture, but also reduce the cost of the maintenance of the tool or implement.

Other objects of the present invention not at this time more particularly enumerated will be clearly understood from the following detailed description of the present invention.

With the various objects in view, the said invention consists, primarily, in the novel tool or implement, in the form of a tool-holder for planing machines, lathes, and other analogous machine-tools, hereinafter set forth; and, the said invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:—

Figure 1 is a side elevation, and Figures 2 and 3 are a front and rear elevation, respectively, of a tool-holder showing one embodiment of the principles of the present invention.

Figure 4 is a top-end view; and Figure 5 is a bottom-end view of the said tool-holder.

Figure 6 is a transverse vertical section of the tool-holder, said section being taken on line 6—6 in said Figure 4.

Figure 7 is a side elevation of the stock or shank of the tool or implement, the cutter being omitted from said view; and Figure 8 is a bottom-end view of the same.

Figure 9 is a side elevation, and Figure 10 a bottom-plan view of the cutter; and Figure 11 is an end view of an anchor or cutter-attaching means, for securing the cutter in its operative relation to the stock or shank of the tool or implement.

Similar characters of reference are employed in all of the said above described views, to indicate corresponding parts.

Referring now to the several figures of the drawings, the reference-character 1 indicates a complete tool or implement made according to and embodying the principles of the present invention, the same comprising a main body or shank 2, usually of rectangular configuration, when viewed from its top-end, said body being provided at its lower end-portion with a forwardly extending abutment, as 3, and upon its lower surface, back of said abutment, with a tool-receiving extension or projection, as 4, which as will be seen more particularly from an inspection of Figure 8 of the drawings, in its width is narrower than the width of the end of the said body or shank 2, so as to provide a pair of guide-portions 5 and 6. At its end, extending near the said abutment 3, the said extension or projection 4 is preferably made arc-shaped, as at 7. The said body or shank 2 is also provided with a tubular hole or duct 8, extending from end to end of the said body and through the said extension or projection 4, as shown in said Figure 6 of the drawings.

The reference-character 9 indicates a cutter which is adapted to be used with the said body 2, said cutter comprising a body-portion 10 formed with a sharp cutting edge 11, and with a shoulder or off-set 12 from which extend rearwardly a pair of arms or fingers 13 and 14, separated by a space 15 conforming to the width of the extension or projection 4, and connected by a curved or arc-shaped portion 16 which corresponds to the arc-shaped portion 7 of the said extension or projection 4. It will be clearly understood from the drawings, that the said cutter may be readily slid into registration with the projection or extension 4, the fingers 13 and 14 being disposed upon the guide-portions 4 and 5, with the arc-shaped portion 16 in registration with the arc-shaped portion 7. To secure the cutter in its assembled relation to the lower end-portion of the body or shank 2, a fastening means is provided, said fastening means consisting, essentially, of a rod or bar 17 provided at it lower end with a plate 18 and a pair of marginal flanges 19, said plate being adapted to be fitted over the registering portions of the said cutter and the said extension or projection 4, with the said flanges 19 extending upwardly for a distance along the opposite faces of the main body or shank, as shown in Figures 1 to 5 inclusive, and the said rod or bar 17 extending upwardly into and through the previously mentioned hole or duct 8, a screw-threaded end-portion 20 of said rod or bar 17 projecting beyond the upper end-surface of the said body or shank 2, and the various assembled parts being securely drawn together, so that the cutter can be safely used, by a tightening nut 21, or other suitable fastening means, as will be clearly understood from an inspection of Figure 2 of the drawings.

The manner of assembling the various parts, and the operation of the tool or implement will be readily understood from the foregoing description and from an inspection of the several figures of the drawings, the tool or implement combining in a practical manner all of the essentials requisite for the production of an effective and accurate combined cutter and holder, and furthermore, by the arrangement of the retaining anchor, all danger of dearrangement or breakage, when in use, is reduced to a minimum, the simple arrangement of the anchor permitting the quick and easy separation of the several devices when it becomes necessary to remove the cutter, as will be clearly evident.

Of course, I am aware that some changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts, as illustrated in the accompanying drawings.

I claim:—

1. A tool or implement of the character specified, comprising a body provided with a longitudinally extending hole, a cutter disposed against one end of said body, an anchoring means for detachably securing said cutter upon said end of the body, said anchoring means comprising a plate and a pair of flanges adapted to embrace said cutter and the end of said body, a rod extending from said plate into and through the hole of said body, said rod having a portion extending from the other end of said body, and means in engagement with the projecting end of said rod for securing the various elements in assembled relation.

2. A tool or implement of the character specified, comprising a body provided with a longitudinally extending hole, a cutter disposed against one end of said body, an anchoring means for detachably securing said cutter upon said end of the body, said anchoring means comprising a plate and a pair of flanges adapted to embrace said cutter and the end of said body, a rod extending from said plate into and through the whole of said body, said rod having a screw-threaded end-portion extending from the other end of said body, and a nut screwed upon the end of said rod for securing the various elements in assembled relation.

3. A tool or implement of the character specified, comprising a body provided with a longitudinally extending hole, and an abutment upon one end-portion of said body, a cutter disposed against said end and the abutment of said body, an anchoring means for detachably securing said cutter against said end and the abutment of said body, said anchoring means comprising a plate and a pair of flanges adapted to embrace said cutter and the end of said body, a rod extending from said plate into and through the hole of said body, said rod having a portion extending from the other end of said body, and means in engagement with the projecting end of said rod for securing the various elements in assembled relation.

4. A tool or implement of the character specified, comprising a body provided with a longitudinally extending hole, and an abutment upon one end-portion of said body, a cutter disposed against said end and the abutment of said body, an anchoring means for detachably securing said cutter against said end and the abutment of said body, said anchoring means comprising a plate and a pair of flanges adapted to embrace said cutter and the end of said body, a rod extending from said plate into and through the hole of said body, said rod having a screw-threaded end-portion extending from the other end of said body, and a nut screwed upon the end of said rod for securing the various elements in assembled relation.

5. A tool or element of the character specified, comprising a body, a projection extending from one end of said body, said projection providing a receiving guide, a bifurcated cutter adapted to be slid over said projection, and means for securing said cutter in fixed relation against said projection and the end of said body.

6. A tool or element of the character specified, comprising a body, a projection extending from one end of said body, said projection providing a receiving guide, a bifurcated cutter adapted to be slid over said projection, said body being provided with a longitudinally extending hole, and an anchoring means for securing said cutter in a fixed position, comprising a plate and a pair of flanges adapted to embrace said cutter and the end of said body, a rod extending from said plate into and through the hole of said body, said rod having a portion extending from the other end of said body, and means in engagement with the projecting end of said rod for securing the various elements in assembled relation.

7. A tool or element of the character specified, comprising a body, a projection extending from one end of said body, said projection providing a receiving guide, a bifurcated cutter adapted to be slid over said projection, said body being provided with a longitudinally extending hole, and an anchoring means for securing said cutter in a fixed position, comprising a plate and a pair of flanges adapted to embrace said cutter and the end of said body, a rod extending from said plate into and through the hole of said body, said rod having a screw-threaded end-portion extending from the other end of said body, and a nut screwed upon the end of said rod for securing the various elements in assembled relation.

8. A tool or implement of the character specified, comprising a body, an abutment upon one end-portion of said body, a projection extending from said end of the said body, directly back of said abutment, said projection providing a receiving guide, a bifurcated cutter back of said abutment, said cutter being adapted to be slid over said projection, and means for securing said cutter in fixed relation against said projection and the abutment.

9. A tool or implement of the character specified, comprising a body, an abutment upon one end-portion of said body, a projection extending from said end of the said body, directly back of said abutment, said projection providing a receiving guide, a bifurcated cutter back of said abutment, said cutter being adapted to be slid over said projection, said body being provided with a longitudinally extending hole, and an anchoring means for securing said cutter in a fixed position, comprising a plate and a pair of flanges adapted to embrace said cutter and the end of said body, a rod extending from said plate into and through the hole of said body, said rod having a portion extending from the other end of said body, and means in engagement with the projecting end of said rod for securing the various elements in assembled relation.

10. A tool or implement of the character specified, comprising a body, an abutment upon one end-portion of said body, a projection extending from said end of said body, directly back of said abutment, said projection providing a receiving guide, a bifurcated cutter back of said abutment, said cutter being adapted to be slid over said projection, said body being provided with a longitudinally extending hole, and an anchoring means for securing said cutter in a fixed position, comprising a plate and a pair of flanges adapted to embrace said cutter and the end of said body, a rod extending from said plate into and through the hole of said body, said rod having a screw-threaded end-portion extending from the other end of said body, and a nut screwed upon the end of said rod for securing the various elements in assembled relation.

In testimony, that I claim the invention set forth above I have hereunto set my hand this 2nd day of August, 1921.

JOHN HUNT.

Witnesses:
FREDK. C. FRAENTZEL,
DORA WALZ.